United States Patent [19]

Jeff

[11] 4,077,555

[45] Mar. 7, 1978

[54] BLADE-BREAKING APPARATUS

[76] Inventor: Adolph L. Jeff, 155 Park La., Rochester, N.Y. 14625

[21] Appl. No.: 768,727

[22] Filed: Feb. 15, 1977

[51] Int. Cl.² .............................................. B26F 3/00
[52] U.S. Cl. ................................................... 225/103
[58] Field of Search ................ 225/103, 104, 105, 93, 225/97; 83/580; 30/124, 258, 278, 286

[56] References Cited

U.S. PATENT DOCUMENTS

| 1,331,212 | 2/1920 | Reilly | 225/103 X |
| 2,418,958 | 4/1947 | Stock | 225/104 |
| 2,627,657 | 2/1953 | Etchen | 30/286 X |
| 3,602,410 | 8/1971 | Dennis | 225/103 X |
| 3,722,033 | 3/1973 | Swan | 30/286 X |

Primary Examiner—J. M. Meister
Attorney, Agent, or Firm—Warren W. Kurz

[57] ABSTRACT

Apparatus for breaking-off a selected portion of a cutting blade to expose a fresh cutting point. The apparatus is adapted to snap a frangible cutting blade along any predesired rectilinear line.

11 Claims, 8 Drawing Figures

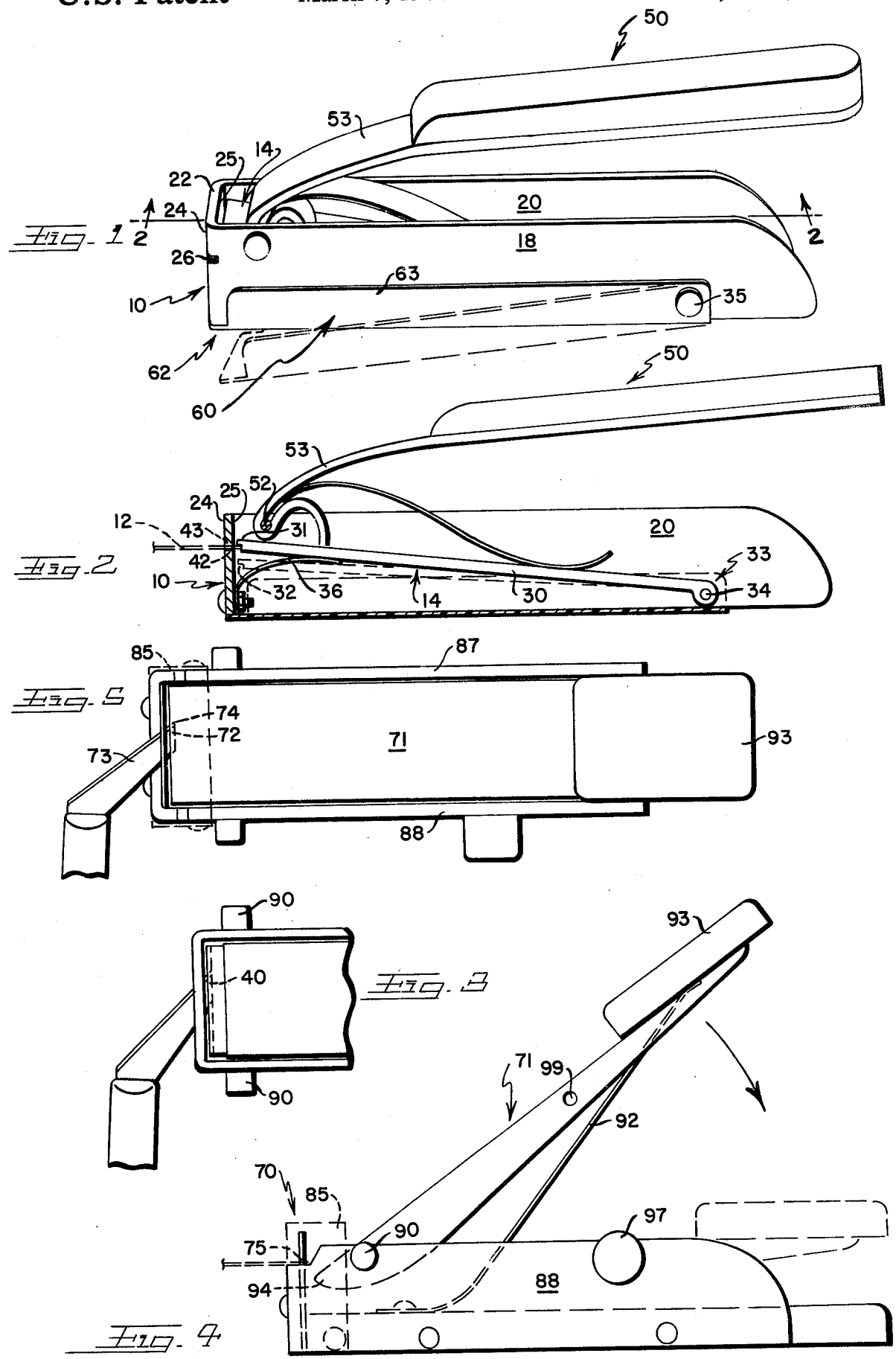

BLADE-BREAKING APPARATUS

CROSS-REFERENCE TO RELATED APPLICATIONS

Reference is hereby made to my pending U.S. Application Ser. No. 768,726, filed on equal date herewith and entitled PRECISION CUTTING TOOL

BACKGROUND OF THE INVENTION

This invention relates to the art of precision cutting, such as that done by graphic artists and designers in creating or reproducing an intricate design or pattern or the like. More particularly, this invention is directed to a hand-tool for refreshening the cutting point of a cutting blade which, through use, has become dull or otherwise unusable.

In my copending U.S. application Ser. No. 768,726 filed Feb. 15, 1977, there is disclosed a precision cutting tool which is particularly well adapted for use by graphic artists and designers in making precise and delicate cuts in this sheets of paper, plastic or the like, as are necessary in the creation or reproduction of intricate designs, patterns, etc. Basically, this tool comprises an elongated handle having a relatively slender cutting blade extending from one end thereof, and means for adjusting the angular position of the cutting blade relative to the handle to achieve a desired "comfort angle". The cutting blade of this tool preferably comprises a relatively thin frangible metal, such as a piece of carbon-steel between 5 and 15 mils in thickness. The blade has a cutting edge which terminates in an extremely fine cutting point defined by the juncture of the cutting edge and the end of the blade. To the graphic artist, this point is the most useful part of the blade, and when it becomes dulled or blunted through use, the utility of the blade for precision cutting is virtually ended because of the difficulty in regaining the original acuity of the point through a simple grinding or honing process. The blade must then be discarded in favor of a fresh blade. While blades of this type are not very expensive, the volume of blades used can be quite substantial. Since the major portion of the cutting edge of such a blade will not even have been used when the blade is discarded on account of a dull cutting point, there is a substantial waste associated with discarding such blades and a corresponding need for an apparatus which will substantially extend the useful lifetime of such blades.

SUMMARY OF THE INVENTION

It is, therefore, an object of the present invention to provide an apparatus for extending the useful lifetime of a thin, frangible cutting blade.

According to the invention, I have found that a cutting blade of the type described above, when subjected to the proper forces, can be "snapped" or caused to break along any substantially rectilinear line, there being no need for scoring the blade to weaken it along such line. By arranging this line transverse to the cutting edge of the blade, a dulled cutting point can be excised from the cutting edge, leaving behind a fresh cutting point. To provide this snapping action, I provide a hand tool comprising:

a. a frame including means defining a substantially rectilinear breaking edge which is adapted to engage one of the planar surfaces of the blade along a desired breaking line;

b. a blade breaking member movably mounted on said frame for movement by hand from an inoperative position toward a blade-breaking position, said member having a surface which, during movement of said member toward said blade-breaking position, is positioned to engage the blade and exert a force on the opposite planar surface thereof at a position spaced from a rectilinear line directly opposite said desired breaking line; and c. means mounted on said frame for exerting a counter-force on said blade to maintain the position of said blade substantially fixed relative to said frame during movement of said breaking member toward said blade-breaking position.

The major advantage of my apparatus is that the cutting point of a thin, frangible cutting blade can be repeatedly refreshened by merely snapping off a small segment of the blade (e.g. a piece only 15 mils in length) containing the dulled cutting point.

Other objects and advantages of the invention will become apparent to those skilled in the art from the ensuing description, reference being made to the accompanying drawings in which like reference characters represent like parts.

BRIEF DESCRIPTION OF THE DRAWINGS

FIG. 1 is a perspective view of a blade-breaking apparatus structured in accordance with a preferred embodiment of the invention;

FIG. 2 is a side elevation of the FIG. 1 apparatus with a portion of the housing removed;

FIG. 3 is a top view of a portion of the apparatus depicted in FIG. 1 showing a blade in position to be broken;

FIGS. 4, 5 and 6 are side, top and end elevational views, respectively, of another embodiment of the invention;

DETAILED DESCRIPTION OF PREFERRED EMBODIMENTS

Figure 7:
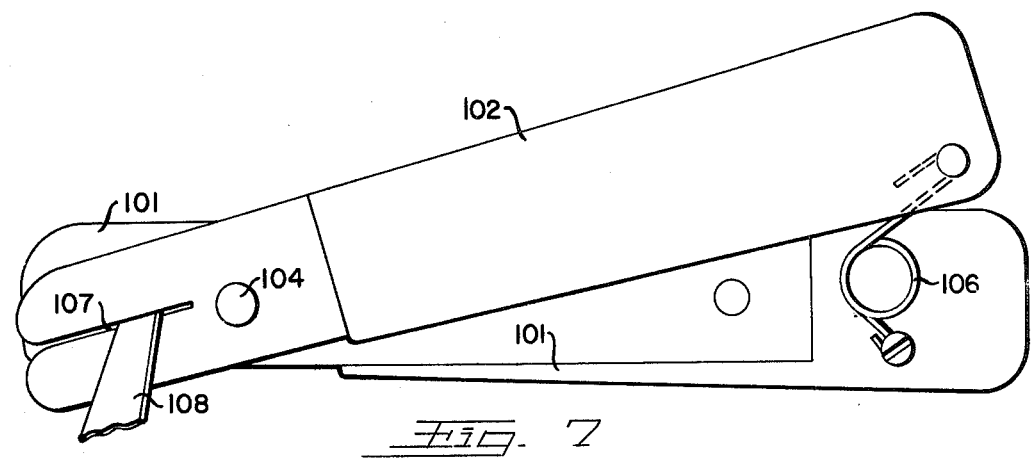
FIG. 7 is a side elevation of a further embodiment of the invention.

Referring now to the drawings, particularly to FIGS. 1-3, a blade-breaking apparatus structured in accordance with a preferred embodiment of the invention is shown to comprise a frame 10 which supports a blade 12 during the breaking operation, and a blade-breaking member 14 which is movably mounted on the frame. Frame 10 is basically a U-shaped structure comprising a pair of upright side walls 18, 20 which are connected by an end wall 22 having front and rear surfaces, 24 and 25, respectively. A rectilinear slot 26 is formed in end wall 22, such slot extending between side walls 18, 20, and having a width slightly greater than the thickness of blade 12.

Blade-breaking member 14 is in the form of an elongated bar 30 having a width slightly less than the spacing between the side walls of frame 10. One end 31 of bar 30 is notched to form a recessed edge 32, and the opposite end 33 is rounded to define a tubular opening 34. Bar 30 is pivotally mounted on frame 10 by means of a pin 35 which is supported by and between the side walls of frame 10, pin 35 being positioned within the tubular opening 34 formed at end 33 of bar 30. A leaf spring 35, connected at one end to the base of end wall 22, urges the free end of bar 30 to pivot about pin 35 in a clockwise direction (as viewed in FIG. 2), to a position shown in the solid lines in FIG. 2. In this position, the free end 31 of bar 30 is positioned slightly above the slot 26 formed in end wall 22 to allow the end of a blade (which is to be broken) to pass through the slot and be positioned beneath such end; also in this position, the recessed edge 32 is located directly opposite slot 26 and thereby serves to meter the amount of blade which is to be broken off.

In operation, the dulled end of a frangible cutting blade 12, such as a carbon steel blade 5–15 mils in thickness, is inserted into slot 26 formed in end wall 22 until it abuts the recessed edge 32 of the breaker member 14. The angular position of the blade relative to end wall 22 is then adjusted to achieve a desired cutting point profile. A downward force is then exerted on the free end of bar 30, thereby urging bar 30 toward a blade-breaking position (as shown in phantom lines in FIG. 2). Applying a downward force on bar 30 exerts a similar force on the end 40 of blade 12, such force tending to pivot blade 12 clockwise about a rectilinear line defined by the bottom edge 42 of slot 26 in the plane of the inner surface 25 of the end wall 22. However, the upper edge 43 of slot 26 in the plane of the outer surface 24 of end wall 22 acts to resits such pivotal movement (i.e. exerts a counterforce) and, when the force exerted on bar 30 is sufficient, the end of the blade, owing to its brittleness and grain, will snap along a substantially rectilinear line defined by edge 42. To facilitate applying the necessary blade-breaking force on bar 30, a lever 50 is pivotally mounted to frame 10 to provide a mechanical advantage to the user. Lever 50 is pivotally mounted on a pin 52 which extends between side walls 18 and 20 and comprises first and second arms 53 and 54 of unequal length. Exerting a downward force on the free end of arm 53 causes arm 54 to exert a downward force on bar 30.

To catch the fragments of blades broken by the aforedescribed apparatus, a tray 60 is pivotally mounted on the bottom of frame 10. Tray 60 comprises a bottom plate 62 and a pair of upright side walls 63, which frictionally engage the sidewalls of frame 10 when the tray is in a fragment-catching position (as shown in the solid line in FIG. 1). To remove blade fragments from the tray, the tray is pivoted to the position shown in phantom lines in FIG. 1. Tray 60 is pivotally mounted to the ends of pin 35 which protrude outwardly from side walls 18, 20.

Figure 6:
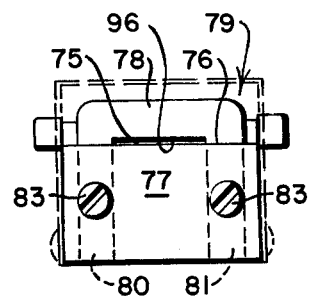

Referring now to FIGS. 4–6, another embodiment of the invention is shown to comprise a blade-holding frame 70 and a blade-breaking lever 71. In this embodiment, the end 72 of a blade 73 which is to be broken to remove a dulled cutting point 74 is inserted in slot 75 formed by the upper edge 76 of the end wall 77 of frame 10 and the base 78 of a U-shaped member 79. The legs 80 and 81 of member 79 are connected to the inner surface of end wall 77 by pins 83. The amount of blade which will be broken off by the apparatus and the profile of the remaining cutting point can be observed through a transparent plastic U-shaped shield 85 which is mounted on the side walls 87, 88 of frame 70. Shield 85 also serves to prevent pieces of the blade which are broken off by the apparatus from flying upward toward the operator.

Blade-breaking lever 71 is pivotally mounted on a pin 90 which extends between side walls 87, 88. A leaf spring 92 acts to urge lever 71 in a counterclockwise direction (as viewed in FIG. 4) to the rest position shown in FIG. 4. As pressure is exerted on the handle 93 of lever 71 in the direction of the arrow, thereby causing the lever to pivot against the spring bias, the blade-breaking end 94 thereof moves in the opposite direction (i.e. upwardly) to engage the end of blade 73 and thereby exert a force thereon. Owing to the counterforce exerted by the upper edge 76 of end wall 77 and the frangibility of the blade, the blade breaks along line 96 of member 79 as lever 71 is pivoted to a blade-breaking in which end 94 is positioned slightly above slot 75.

As shown in FIGS. 4 and 5, lever 71 can be locked in a depressed position (shown in phantom lines in FIG. 4) by a pin 97 which engages aligned apertures 98 formed in side wall 88 and lever 71.

Figure 8:
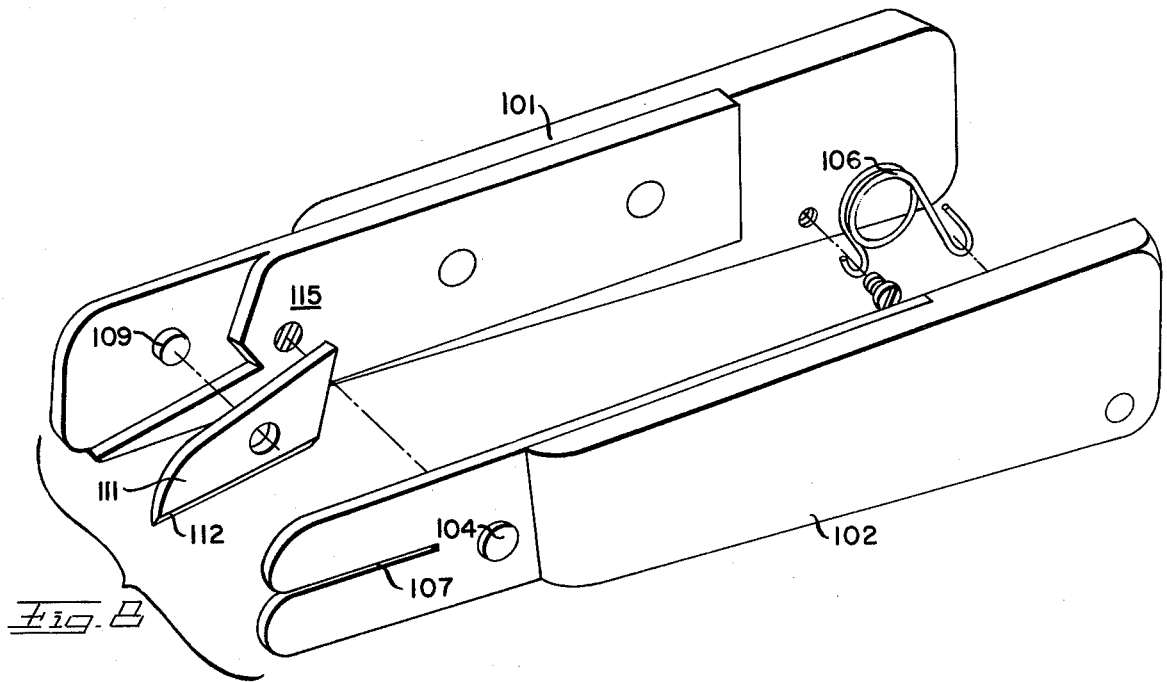
FIG. 8 is an exploded perspective view of the apparatus depicted in FIG. 7.

A further embodiment of the invention is depicted in FIGS. 7 and 8. Here, the blade-breaking hand-tool of the invention comprises first and second handle members, 100 and 101, respectively, which are pivotally connected by a pin 104. A spring 106 acts to bias the handle members toward a rest position as shown in FIG. 7. One end of handle member 102 is provided with a slot 107 to receive and hold a blade which is to be broken. The other handle member 101 acts as the blade-breaker. Pivotally mounted at one end of member 101 via pin 109 at a position opposite slot 107 is a self-aligning breaker bar 111 which, prior to the breaking operation, aligns its blade-breaking edge 112 across one surface of the blade. Edge 112 is leveled toward the inner surface of handle member 101, as shown in FIG. 8, and thereby engages the blade at a position slightly spaced from the inner edge of slot 107. This spacing provides a breaking moment about the inner edge of slot 107 as a force is exerted to compress or squeeze the handle members together. The outer edge of slot 107 provides a counterforce on the blade as the handle members are compressed together. A spacer bar 115 is mounted on the inner wall 116 of handle member 101 to compensate for the space required by the breaker bar 111. Fragments of the blade are collected in a space directly under the breaker bar.

The blade-breaking apparatus described above has been found to be particularly useful in accurately breaking the blade portions of the common industrial singleedge razor blade, such as that manufactured by American Safety Razor Company, New York, N.Y., as well as the single-edge injector razor blade manufactured by Schick Safety Razor Company, a division of Warner Lamberts, Milford, Conn.

While the invention has been described with particular reference to preferred embodiments, various modifications and variations will become evident to those skilled in the art without departing from the spirit of the invention. Such variations are intended to fall within the scope of the invention, as defined by the following claims.

What is claimed is:

1. A hand tool for breaking the blade portion of a frangible blade along a substantially rectilinear line extending transverse to the cutting edge, such blade having a pair of opposing planar surfaces, said tool comprising:

a. a frame including means defining a substantially rectilinear breaking edge which is adapted to engage one of the planar surfaces of the blade along a desired breaking line;

b. a blade-breaking member pivotally mounted relative to said frame for movement by hand from an inoperative position toward a blade-breaking position, said member having a surface which, during movement of said member toward said blade-breaking position, is positioned to engage the blade and exert a force on the opposite planar surface thereof at a position spaced from a rectilinear line directly opposite said desired breaking line; and c. means mounted on said frame for exerting a counterforce on said blade to maintain the position of said blade substantially fixed relative to said frame during movement of said breaking member toward said blade-breaking position.

2. The hand tool as defined in claim 1 wherein said counterforce-exerting means comprises a stationary member mounted on said frame and positioned to engage the same planar surface of the blade as that engaged by said breaking member, said stationary member engaging such surface at a position on the opposite side of breaking line from that engaged by said breaking member.

3. The hand tool as defined in claim 1 further comprising spring means for biasing said breaking member toward said inoperative position.

4. The hand tool as defined in claim 1 further comprising a shield for preventing broken pieces of the blade from striking the operator during use of said tool.

5. The hand tool as defined in claim 4 wherein said shield is made from a transparent material.

6. The hand tool as defined in claim 4 wherein said shield comprises means defining a chamber for collecting broken pieces of razor blades which are broken during movement of said breaking member toward said blade-breaking position.

7. The hand tool as defined in claim 1 further comprising a lever, pivotally mounted on said frame, said lever being manually movable from an inoperative position toward an operative position in which one end thereof exerts a force on said breaking member to move said breaking member toward said blade-breaking position.

8. The hand tool as defined in claim 7 further comprising spring means for urging said lever toward said inoperative position.

9. The hand tool as defined in claim 1 wherein said breaking member comprises a rectilinear edge which extends across said planar surface of the blade parallel to said breaking line.

10. The hand tool as defined in claim 1 wherein said blade-engaging surface of said breaking member forms a part of a bar which is pivotally mounted on said breaker member, whereby during movement of said breaker member toward said blade-breaking position, said surface aligns itself to engage said opposite planar surface of the blade along the entire breaking line.

11. The hand tool as defined in claim 10 wherein said blade-breaking surface is leveled to engage the blade at a position spaced from said breaking line.

* * * * *